United States Patent [19]
Sathe et al.

[11] Patent Number: 6,021,216
[45] Date of Patent: Feb. 1, 2000

[54] REDUCTION OF NOISE VISIBILITY IN A DIGITAL VIDEO SYSTEM

[75] Inventors: Vinay Sathe, San Diego; Woo H. Paik, Encinitas, both of Calif.

[73] Assignee: General Instrument Corporation, Horsham, Pa.

[21] Appl. No.: 09/226,770

[22] Filed: Jan. 6, 1999

Related U.S. Application Data

[63] Continuation of application No. 08/573,480, Dec. 15, 1995, Pat. No. 5,909,249.

[51] Int. Cl.$^7$ ................................. G06K 9/00; G06K 9/36
[52] U.S. Cl. .......................... 382/166; 382/233; 382/248; 382/274
[58] Field of Search ..................................... 382/166, 167, 382/248, 274, 275, 260, 261, 233; 348/402, 403, 674, 241, 252, 608, 25, 28, 420

[56] References Cited

U.S. PATENT DOCUMENTS

| | | |
|---|---|---|
| 5,325,125 | 6/1994 | Naimpally et al. . |
| 5,394,195 | 2/1995 | Herman . |
| 5,426,463 | 6/1995 | Reininger et al. . |
| 5,473,373 | 12/1995 | Hwung et al. . |
| 5,500,678 | 3/1996 | Puri . |
| 5,543,820 | 8/1996 | Edgar . |
| 5,608,652 | 3/1997 | Astle . |
| 5,651,078 | 7/1997 | Chan . |
| 5,850,471 | 12/1998 | Brett ......................................... 382/162 |
| 5,930,386 | 7/1999 | Saito ....................................... 382/166 |

OTHER PUBLICATIONS

H. Köhne, "2-H-Adaptive Combfilter Video Processor," *IEEE Transactions on Consumer Electronics*, vol. 37, No. 3, Aug. 1991, pp. 303-308.

C. P. Sandbank, "Digital Television," © 1990 by John Wiley & Sons Ltd., England, pp. 507-509.

*Primary Examiner*—Phuoc Tran
*Attorney, Agent, or Firm*—Barry R. Lipsitz; Ralph F. Hoppin

[57] ABSTRACT

The effects of noise in a video processing system are reduced, resulting in improved image quality. A digital video signal containing a luminance component in Y color space is processed by increasing the amplitude of the luminance data in accordance with a nonlinear transfer function. As a result, low-amplitude components of the luminance signal are reduced. Subsequent quantization errors in transform coefficients produced by a spatial compression routine in a video encoder are consequently reduced. Inverse operations are performed at a video decoder to recover the original luminance data. The invention reduces quantization noise which is manifested particularly as dust-like variations in luminance intensity in an otherwise darkened region of a video image. A decoder apparatus is also presented.

12 Claims, 4 Drawing Sheets

REDUCTION OF NOISE VISIBILITY IN A DIGITAL VIDEO SYSTEM

This application is a continuation of U.S. patent application Ser. No. 08/573,480, filed on Dec. 15, 1995, now U.S. Pat. No. 5,909,249.

BACKGROUND OF THE INVENTION

The present invention relates to a method and apparatus for reducing the effects of noise in a digital video system. In particular, low amplitude luminance components of a video signal are processed to reduce the relative intensity of noise, thereby resulting in improved image quality.

Generally, it is known that digital transmission of television signals can deliver video and audio services of much higher quality than analog techniques. Digital transmission schemes are particularly advantageous for signals that are broadcast via a cable television network or by satellite to cable television affiliates and/or directly to home satellite television receivers. It is expected that digital television transmitter and receiver systems will replace existing analog systems just as digital compact discs have replaced analog phonograph records in the audio industry.

A substantial amount of digital data must be transmitted in any digital television system. In a digital television system, a subscriber receives the digital data stream via a receiver/descrambler that provides video, audio and data to the subscriber. In order to most efficiently use the available radio frequency spectrum, it is advantageous to compress the digital television signals to minimize the amount of data that must be transmitted. Accordingly, various compression techniques have been developed which allow the processing of large amounts of data without significantly affecting the final quality of the displayed video image.

However, a significant amount of noise can be caused, for example, by quantization of a video signal. Quantization noise is introduced in digital communication systems when the number of bits used to represent a signal is reduced. For example, in a video transmitter, the maximum bit transmission rate is limited by the processing speed of various hardware components. Moreover, since the bit rate of data input to the transmitter may vary with time, the number of bits which can be allocated to represent the data can also vary. In particular, the use of compression techniques in video data processing can result in quantization error or noise that is relatively larger for low amplitude signals. That is, quantization noise can be more visible after performing spatial compression of portions of the image where the picture intensity (e.g., amplitude of the luminance component) is relatively low compared to the remaining portion of the image.

The presence of noise in the output of a digital video compression system tends to reduce the visual quality of images displayed, for example, at a television receiver. Moreover, this noise can be amplified by subsequent compression, transmission, reception and decompression processes. Previous methods to improve the image quality include an adaptive method, where more data bits are allocated to represent the low level luminance portions of an image. Other picture content-based adaptive compression techniques, such as increasing the picture bit rate of the compression system when low level luminance signals are detected, are also possible. However, these methods are inherently complex and require additional hardware to implement, thereby also driving up manufacturing costs. Moreover, the adaptive techniques are not easily used with different types of video signals.

Quantization is one form of compression that reduces the amount of data which is transmitted in a video system. Such quantization may be used with the well known Discrete Cosine Transform (DCT) to allow efficient transmission of digital video signals over conventional communication channels. The DCT transforms a block of pixels into a new block of transform coefficients. The transform is applied to each block until the entire image has been transformed. At the decoder, the inverse transformation is applied to recover the original image. The DCT merely transforms an image area from a fixed number of pixels to an equal number of transform coefficients. In order to compress the image, it is necessary to take advantage of an important property of the DCT. For typical images, a very large proportion of the signal energy is compacted into a small number of transform coefficients.

Coefficient quantization, or normalization, is a process that introduces small changes into the image in order to improve coding efficiency. This is done by truncating the DCT coefficients to a fixed number of bits. The truncation can be performed by shifting a coefficient from left to right and spilling the least significant bits off the end of a register holding the coefficient. In this way, the amplitude of the coefficient is also reduced. The number of bits used to represent each of the coefficients in the block of coefficients is assigned individually. The number of bits can be further reduced or increased as necessary to maintain a constant bit rate.

The most powerful compression systems not only take advantage of spatial correlation, but can also utilize similarities among adjacent frames to further compact the data. In such "motion compensation" systems, differential encoding is usually used to transmit only the difference between an actual frame and a prediction of the actual frame. The prediction is based on information derived from a previous frame of the same video sequence. Examples of video compression systems using the techniques of DCT quantization and motion compensation can be found in Krause, et al., U.S. Pat. Nos. 5,057,916; 5,068,724; 5,091,782; 5,093,720; and 5,235,419.

Moreover, in order to implement video compression in practical systems, a video decompression processor is required for each digital television receiver. Typically, filtering processes are performed at the receiver which correspond to the inverse of the filtering processes performed at the transmitter. In this way, the original data signal can be recovered. In particular, the development of very large scale integration (VLSI) integrated circuit chips is currently underway to implement such video decompression processors. However, in consumer products such as television sets, it is imperative that the cost of the system components be kept as low as possible.

It would be advantageous to reduce the effects of noise on a digital video signal, and particularly quantization noise that degrades low level luminance portions of an image, in order to improve image quality. In particular, a method and apparatus is needed that is relatively easy to implement yet still achieves the desired effect of masking noise at portions of a video image which have low amplitude luminance components. Moreover, it would be further advantageous to provide a system that is effective with different types of picture content.

The present invention provides a method and apparatus for reducing the effects of noise on a digital video signal which enjoys the above and other advantages.

SUMMARY OF THE INVENTION

In accordance with the present invention, a method and apparatus for reducing the effects of noise in a digital video system are provided. In particular, low amplitude luminance components of a video signal are processed (e.g., filtered) to reduce the relative intensity of noise, thereby resulting in improved image quality.

For example, consider a video frame representing a nighttime scene of a movie. In this case, the amplitude of the luminance data represents the signal intensity. Noise in the signal may be visible to the viewer as small dust-like variations in the luminance intensity which tend to be more visible in the darker portions of the image. Moreover, each video frame may have different noise components, thereby causing a time-varying distortion in the image. The time-varying nature of the noise is further likely to be noticed by the viewer since the human eye is more sensitive to moving images than to intensity changes in a still image.

According to the present invention, a method and apparatus are presented for reducing the detrimental effects of noise in a digital video processing system. In one embodiment, a method for reducing the effects of noise includes providing an analog video signal containing data in Red-Green-Blue color space to a video encoder and transforming the signal to digital Y-U-V color space. In Y-U-V color space, the Y component represents luminance data, and the U and V components represent chrominance data. The three components are carried as separate signals. Moreover, the luminance data has an amplitude range with a minimum value and a maximum value.

Next, the luminance data is processed by increasing the amplitude of the data with a nonlinear transfer function. The transfer function can comprise gamma correction which boosts the lower amplitudes relatively more than the higher amplitudes. This method provides a smoothly continuous amplitude profile that avoids undesirable discontinuities and inflection points.

The processed luminance data is then multiplexed with the U and V chrominance signals. The processed luminance data along with the chrominance data is then compressed in various processing steps. Commonly, a block-based spatial compression technique such as the Discrete Cosine Transform (DCT) is first performed on a block of data, for example, representing an image area of 8×8 pixels wherein each pixel comprises an 8 bit luminance video sample. An 8×8 block of transform coefficients is produced by the DCT. No compression has occurred as of yet since, in fact, the number of transform coefficients will equal the number of pixels in each block. The DCT transform coefficients represent the relative amount of two-dimensional spatial frequencies contained in the sixty-four pixel input block. For neighboring pixels which vary slowly across the image, the transform coefficient will have a zero or near-zero amplitude. This information is used to reduce the amount of data that must be encoded and transmitted.

Next, the processed luminance data is quantized using a predetermined quantization threshold. The quantization threshold chosen for each transform coefficient corresponds to a perceptual threshold that a typical viewer under typical viewing conditions would not be able to detect. This step results in truncating the coefficient values so they can be represented by a reduced, predetermined number of bits. The quantized luminance transform coefficients are then made available for additional processing, including, for example, motion compensation and/or entropy encoding in a Huffman encoder. The video signal, including the luminance and chrominance transform coefficient data, is multiplexed with other signals, including audio, data, and channel control ("housekeeping") signals and finally transmitted over the desired communication path.

In accordance with the present invention, the processing step involves first normalizing the luminance data by multiplying by a scaling factor to obtain a value $Y_{in}$. Next, the processed luminance data values $Y_{out}$ are calculated, for example, by using a gamma correction technique. The optimum value of gamma can be determined experimentally or analytically.

In another embodiment of the present invention, a compressed digital video signal is provided to a video decoder. The decoder decompresses the compressed digital video signal by performing inverse entropy decoding, inverse DCT (IDCT) and other operations including, for example, motion compensation. The decompressed signal is then demultiplexed in order to recover the video signal in separate chrominance and luminance signals in Y-U-V color space. In accordance with the present invention, the original luminance data is recovered by decreasing the amplitude of the received luminance data in a manner which is inverse to the processing performed by the encoder. The luminance data is then available for additional processing and display on a display device such as a television.

In yet another embodiment of the present invention, a decoder for reducing noise visibility in a video processing system is disclosed. The decoder includes processing means for decompressing a compressed digital video signal to provide a video signal containing chrominance data and luminance data in Y-U-V color space. A processor is provided for processing the luminance data by decreasing the amplitude of the luminance data in accordance with a nonlinear transfer function. The processing means includes a memory for storing look-up table data.

DETAILED DESCRIPTION OF THE INVENTION

In accordance with the present invention, a method and apparatus are provided for reducing the effects of noise on low amplitude luminance components of a video signal. In particular, the low amplitude luminance components of a digital video signal are processed prior to a spatial transformation and quantization in order to reduce the relative intensity of noise, thereby providing improved image quality.

Figure 1:
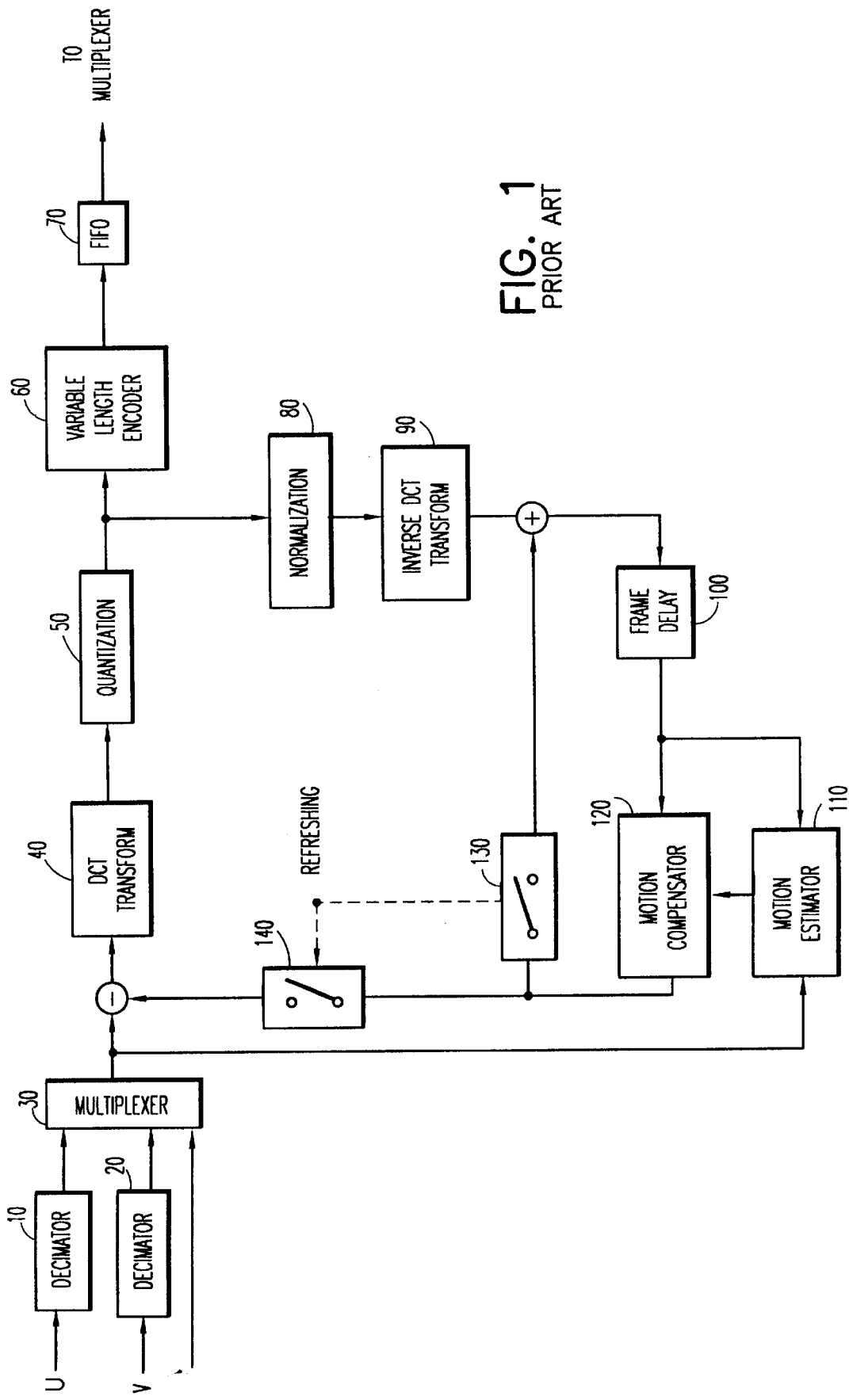
FIG. 1 is a block diagram of a prior art digital video encoder.

FIG. 1 is a block diagram of a prior art digital video encoder. A pre-processor (not shown) receives video image data in Red-Green-Blue (R-G-B) space, for example, from a video camera. The pre-processor transforms the signal to Y-U-V color space by separating the video signal into a luminance component Y and chrominance components U and V. The luminance component Y is a digital signal that represents the illumination intensity of discrete pixels. The pixel data is carried in blocks of 8×8 pixels. The U and V chrominance components are decimated horizontally and vertically at decimators 10 and 20.

The chrominance components U and V are then multiplexed with the luminance component Y at multiplexer 30 and provided to a transform subsystem 40. Here, a block-based spatial transform technique such as the Discrete Cosine Transform (DCT) is performed on blocks of luminance and chrominance data. For example, an 8×8 block of pixel luminance data can be transformed to an 8×8 block of transform coefficients F(u, v), as defined by:

$$F(u, v) = \frac{4C(u)C(v)}{N^2} \sum_{i=0}^{N-1} \sum_{j=0}^{N-1} f(i, j) \cos\frac{(2i+1)u\pi}{2N} \cos\frac{(2j+1)v\pi}{2N}$$

where f(i,j) represents the pixel luminance as a function of horizontal position j and vertical position i, F(u, v) represents the value of the transform coefficients, N is the horizontal and vertical dimension of the block, and C(u) and C(v) are scaling constants such that $C(u), C(v)=1$ for u, v ∈ [1, ..., N−1], and $C(u), C(v)=1/\sqrt{2}$ for u, v=0. The transform coefficients are orthogonal basis signals that represent the relative amount of two-dimensional spacial frequencies contained in the sixty-four pixel input block. Thus, for neighboring pixels which vary slowly across the image, many of the transform coefficients will have a zero or near-zero amplitude. These coefficients do not provide significant data and therefore need not be coded and transmitted.

The blocks of data which are input to the transform subsystem 40 typically comprise signed integers with range $[-2^{P-1}, 2^{P-1}-1]$, or [−128, 127] when P=8 bits is the precision used to represent each pixel data point in the luminance and chrominance signals. Next, the transform coefficient data is quantized at the quantizer 50. The quantizer can comprise, for example, a dedicated computer chip such as an application-specific integrated circuit (ASIC). Quantization constitutes a many-to-one mapping and is the principal source of lossiness (i.e., noise or error) in DCT-based encoders. At the quantizer 50, the transform coefficients F(u, v) are divided by a corresponding step size Q(u, v) and rounded to the nearest integer, as follows:

$$F^Q(u, v) = \text{Integer Round}\left(\frac{F(u, v)}{Q(u, v)}\right)$$

where $F^Q(u, v)$ is the quantized transform coefficient function. The step size Q(u, v) is chosen for each transform coefficient according to a perceptual threshold that will not significantly degrade the final video image quality. That is, the step size should be as large as possible to reduce the transform coefficient to a number which is as small as possible and can therefore be represented by a reduced number of bits. The step size Q(u, v) can be any integer value from one to $2^P-1$ (e.g., from one to 255 when P=8 bits is the precision used to represent each pixel data point).

Ideally, the encoder will be able to allocate the same number of bits (e.g., 9 bits, not including the sign bit) for each of the transform coefficients. However, in practice, the number of bits which can be allocated is limited and must be determined in a manner that will optimize the quality of the transmitted video signal. The number of bits which are allocated to each transform coefficient is thus preassigned individually and can be adjusted on a real-time basis by a feedback signal (not shown) from the FIFO buffer 70 to the quantizer 50. The feedback signal indicates when the buffer is getting filled or has room to process more data.

The optimal bit allocation is determined by noting that in an N×N block of transform coefficients, the coefficients which represent lower spatial frequencies appear at the upper left hand portion of the block, while the coefficients which represent higher spatial frequencies appear at the lower right hand portion of the block. Therefore, since the lower frequency coefficients provide more information than the high frequency coefficients, more bits can be allocated to represent the lower frequency coefficients. Table 1 shows a typical bit allocation arrangement for the DCT transform coefficients when only $B_2=212$ bits (instead of $B_1=8$ bits×64 coefficients=512 bits) are available for each 8×8 block:

TABLE 1

| 9 | 8 | 7 | 6 | 5 | 4 | 3 | 2 |
|---|---|---|---|---|---|---|---|
| 8 | 7 | 6 | 5 | 4 | 3 | 2 | 2 |
| 7 | 6 | 5 | 4 | 3 | 2 | 2 | 2 |
| 6 | 5 | 4 | 3 | 2 | 2 | 2 | 2 |
| 5 | 4 | 3 | 2 | 2 | 2 | 2 | 2 |
| 4 | 3 | 2 | 2 | 2 | 2 | 2 | 2 |
| 3 | 2 | 2 | 2 | 2 | 2 | 2 | 2 |
| 2 | 2 | 2 | 2 | 2 | 2 | 2 | 2 |

A quantization error is thus introduced since the number of bits used to represent many of the coefficient values is reduced. In particular, it has been found that quantization errors in high-frequency, low-amplitude luminance data results in undesirable noise that is manifested as dust-like variations in luminance intensity in an otherwise darkened region of a video image.

The quantized data then passes to a variable length encoder 60 where entropy encoding occurs. This encoding can comprise, for example, Huffman coding or Arithmetic coding. For Huffman coding, the 8×8 block of truncated DCT coefficients represented by $F^Q(u, v)$ are serialized into a sequence of sixty-four elements and then coded. Code words are assigned to each element which indicate the amplitude of the coefficient and the number of zero-amplitude data elements preceding it, if any.

The entropy-encoded data is then supplied to a rate buffer such as a FIFO (first-in, first-out) buffer 70. This buffer limits the bit rate of data that can pass through the video encoder. Additionally, as discussed, the FIFO buffer 70 provides a feedback signal (not shown) in order to adjust the bit allocation in the quantizer 50. The feedback signal indicates when the buffer 70 is getting filled or has room to process more data. For example, when the buffer 70 is getting filled, the bit allocation level is reduced, and when the buffer has room to store additional data, the bit allocation level is increased.

Still referring to FIG. 1, the prior art video encoder includes means for refreshing a current video signal and applying motion compensation to the video signal, as is known by those skilled in the art. A normalization subsystem 80 accounts for the normalizing that occurred in the DCT subsystem 40, while an inverse DCT subsystem 90 transforms the DCT coefficients back to the luminance or chrominance amplitude domain. Frame delay 100, motion estimator 110, and motion compensator 120 are also provided as part of the motion compensation means. Refresh switches 130 and 140 provide a new full frame video image periodically or in response to the detection of an error.

Figure 2:
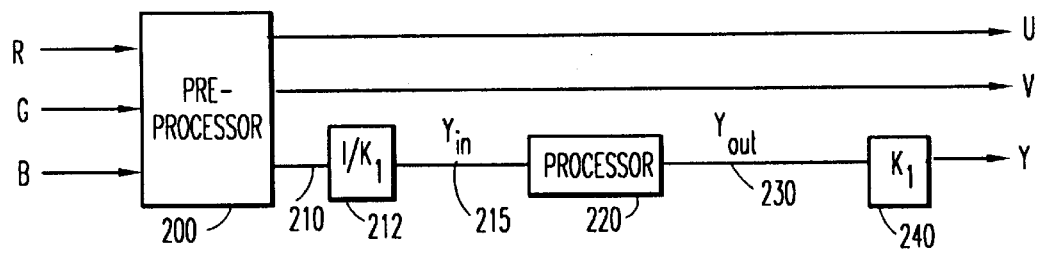
FIG. 2 is a block diagram of a circuit for use with a digital video encoder for reducing the effects of noise on a video signal.

FIG. 2 is a block diagram of a circuit in accordance with the present invention for use with a digital video encoder for reducing the effects of noise on a video signal. A pre-processor 200 receives video image data in Red-Green-Blue (R-G-B) space, for example, from a video camera. The pre-processor 200 transforms the signal to Y-U-V color space by separating the video signal into a luminance component 210 and chrominance components U and V. The three components are carried as separate signals. Moreover, the luminance data signal 210 has an amplitude range with a minimum value and a maximum value. The pre-processor 200 can comprise a low-pass filter and analog-to-digital converter.

Next, the luminance data signal 210 is processed by increasing the amplitude of the luminance data in accordance with a nonlinear transfer function. In accordance with the present invention, the processing step involves first normalizing the luminance data by multiplying by a scaling factor $1/K_1$ at multiplier 212 to obtain a value $Y_{in}$ on line 215. Next, the processed luminance data values $Y_{out}$ provided on 230 are calculated at processor 220 by using a nonlinear transfer function such as that determined in accordance with a gamma correction technique, as discussed below. The processed and normalized luminance data value $Y_{out}$ on line 230 is then multiplied by the scaling factor $K_1$ at multiplier 240, thereby resulting in the luminance signal Y. The luminance signal Y is then ready for processing by the conventional video encoder of FIG. 1. The scaling factor $K_1$ can be set to the maximum intensity value of the luminance data.

Figure 3:
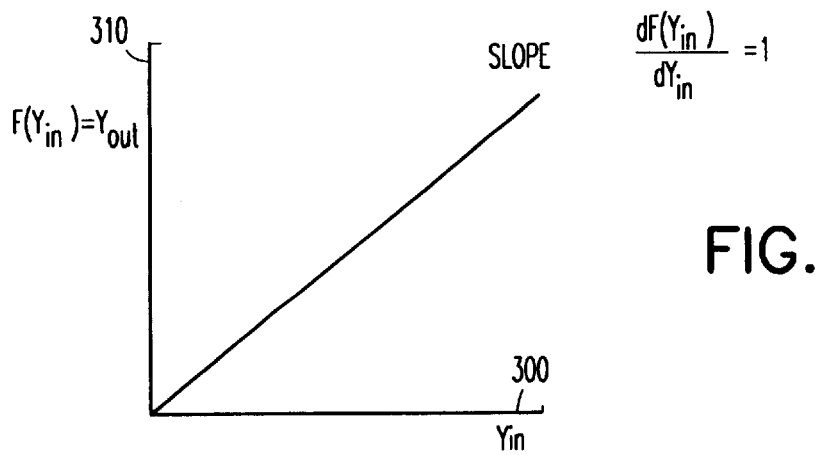
FIG. 3 is a graphical depiction of a function for determining a transfer function of an encoder processor without correction.

FIG. 3 is a graphical depiction of a function for determining a transfer function of an encoder processor without correction. The horizontal axis 300 depicts the amplitude of the scaled luminance input signal $Y_{in}$, while the vertical axis 310 indicates the amplitude of a function $F(Y_{in})$. A transfer function $H(Y_{in})$ is then defined as the slope of $F(Y_{in})$, or $$H(Y_{in}) = dF(Y_{in})/d(Y_{in}).$$

The scaled luminance output signal $Y_{out}$ is related to the scaled input signal $Y_{in}$ by $$Y_{out} = Y_{in} \times H(Y_{in}).$$

The transfer function can be implemented in the processor 220 by providing a memory with a look-up table of data, as is known to those skilled in the art. Thus, for a given input $Y_{in}$, a corresponding value of $H(Y_{in})$ is output from the table.

Figure 4:
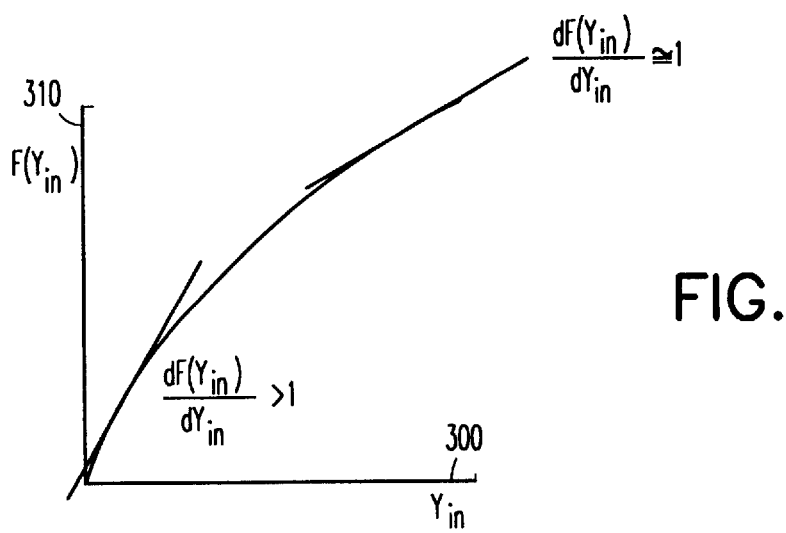
FIG. 4 is a graphical depiction of a function for determining a transfer function of an encoder processor with correction.

FIG. 4 is a graphical depiction of a function for determining a transfer function of an encoder processor with correction. The function $F(Y_{in})$ can be determined in accordance with a gamma correcting technique. With this technique, $F(Y_{in})$ is defined by $F(Y_{in}) = Y_{in}^{1/\gamma}$, where gamma is a number between approximately one and two. Alternately, gamma may be a function which is based on $Y_{in}$ and which varies between approximately one and two. As before, the transfer function is defined as the slope of the function $F(Y_{in})$, or $H(Y_{in}) = Df(Y_{in})/d(Y_{in})$. For low values of the scaled luminance input signal $Y_{in}$, the slope of the function $F(Y_{in})$ is significantly greater than unity. Therefore the transfer function $H(Y_{in})$ will be relatively large, and the resulting amplification of the luminance signal will be relatively large. The luminance signal will consequently be boosted relatively more at the lower end than at the higher end. As a result, the quantization error at the quantizer 50 (FIG. 1) will be reduced because of the reduced presence of high-frequency, low amplitude transform components in the data. This reduced quantization error or noise in the video signal at the encoder will ultimately result in an improved video image.

For high values of the scaled luminance input signal $Y_{in}$, the slope of the function $F(Y_{in})$ is close to unity, and the transfer function $H(Y_{in})$ will also be close to unity. As a result, there will be relatively little amplification of the luminance signal components at the higher end of the luminance intensity range. Those skilled in the art will recognize that various transfer functions may be employed. For example, gamma need not be a constant by may be a decreasing number which varies, for example, from 1.2 to 1.0 as the luminance intensity varies from the low end to the high end. Moreover, optimum values of gamma can be determined experimentally or analytically. Other modifications, variations, and permutations are similarly encompassed by the present invention.

Figure 6:
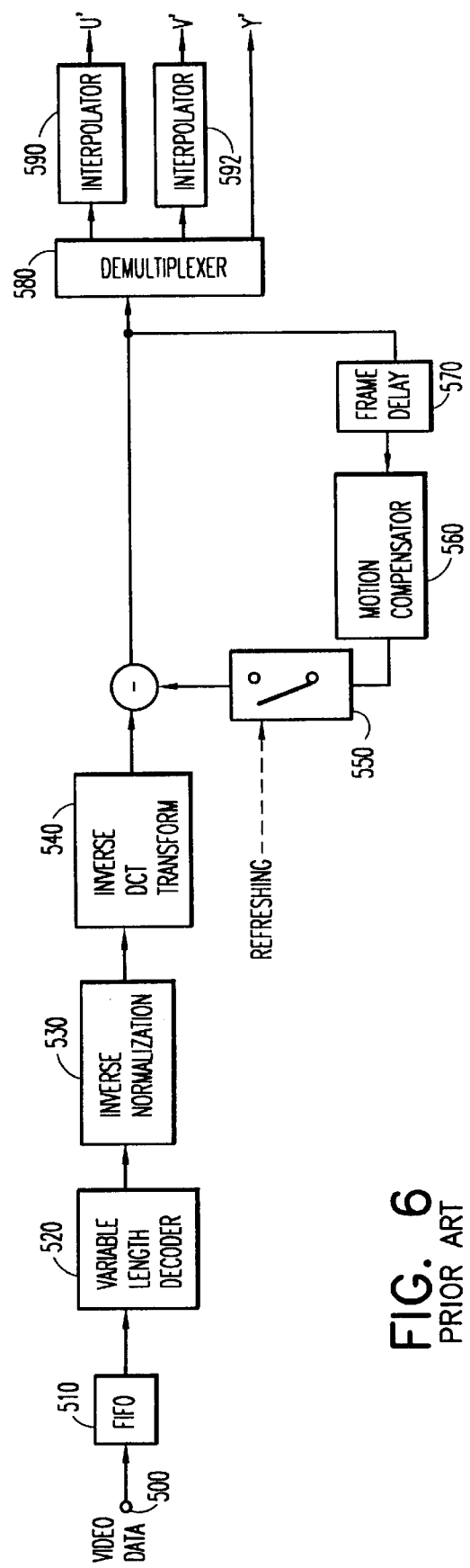
FIG. 6 is a block diagram of a prior art digital video decoder.

FIG. 6 is a block diagram of a prior art digital video decoder. A transmitted data stream, which contains video, audio, data, and control signals, is received at terminal 500 and sent to a FIFO buffer 510. The FIFO buffer 510 accommodates received data bit rates which exceed the processing capabilities of the decoder by temporarily storing the excess data and outputting a relatively constant bit rate data stream to the variable length decoder 520. Inverse operations are performed therein to recover the data in its state prior to entropy encoding.

An inverse normalizer 530 in the decoder performs inverse normalization and an inverse DCT (IDCT) function 540 performs an inverse DCT, thereby recovering the pixel data in Y-U-V color space. Refresh switch 550 works in conjunction with motion compensator 560 and frame delay 570 to provide a full frame video image update on a periodic or as-needed basis. The luminance and chrominance pixel data is recovered as individual signals in demultiplexer 580. The chrominance data is passed through interpolators 590 and 592 in order to recover signals U and V. Luminance signal Y is also recovered. The luminance and chrominance data is then ready for processing by a post-processor (not shown) where the Y, U and V signals are converted to analog data in R-G-B signal space and provided, for example, for display on a television.

Figure 7:
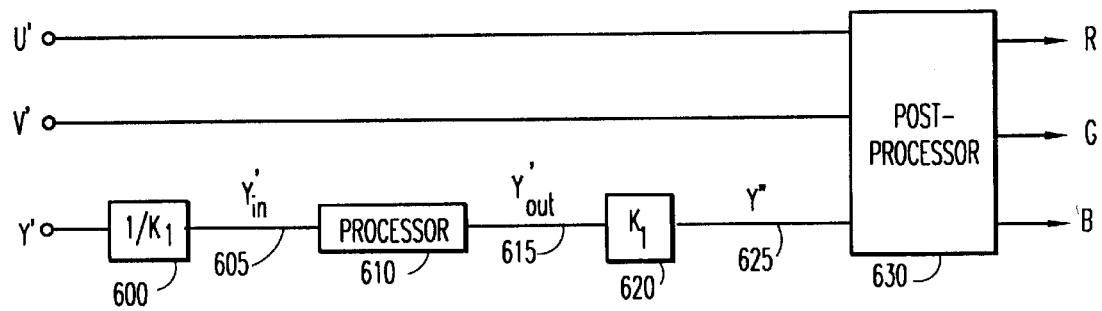
FIG. 7 is a block diagram of a processor for use with a digital video decoder for reducing the effects of noise on a video signal.

FIG. 7 is a block diagram of a circuit for use with a digital video decoder for reducing the effects of noise on a video signal. The luminance signal Y', which has an amplitude range with a minimum value and a maximum value, is scaled by a factor $1/K_1$ at multiplier 600 to produce the signal $Y'_{in}$ on line 605. The signal $Y'_{in}$ is processed at the processor 610 by performing a transformation that is the inverse of that performed in processor 220 (FIG. 2) by decreasing the amplitude of the luminance data using a nonlinear transfer function. In accordance with the present invention, processed luminance data values $Y'_{out}$ provided on line 615 are calculated by using a nonlinear transfer function $H(Y'_{in})$. The processed and normalized luminance data values $Y'_{out}$ are then multiplied by a scaling factor $K_1$ at multiplier 620, resulting in the luminance signal Y" on line 625. The luminance signal Y" along with the chrominance signals U' and V' are then passed through a post-processor 630 and transformed to an analog signal in R-G-B color space. The post-processor 630 can comprise a digital-to-analog converter. The R-G-B signal is then provided, for example, for display on a television.

Figure 5:
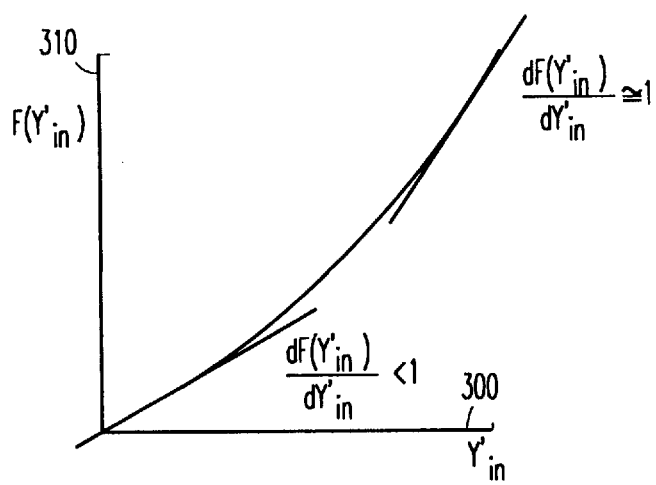
FIG. 5 is a graphical depiction of a function for determining a transfer function of a decoder processor with correction.

FIG. 5 is a an example graphical depiction of a function for determining the transfer function of a decoder processor with correction in accordance with the invention. The horizontal axis 300 depicts the amplitude of the scaled luminance input signal $Y'_{in}$, while the vertical axis 310 indicates the amplitude of a function $F(Y'_{in})$. A transfer function $H(Y'_{in})$ is then defined as the slope of $F(Y'_{in})$. The function $F(Y'_{in})$ can be determined in accordance with an inverse gamma correcting technique which is analogous to that discussed previously. With this technique, $F(Y'_{in})$ is defined by $F(Y'_{in})=Y'_{in}{}^{\gamma}$, where gamma is a number between approximately one and two. As before, the transfer function is $H(Y'_{in})=dF(Y'_{in})/d(Y'_{in})$. The amplitude of the scaled luminance input signal $Y'_{in}$ from line 605 (FIG. 7) is thus reduced in accordance with the slope of $F(Y'_{in})$. For example, at lower values of $Y'_{in}$, the slope of $F(Y'_{in})$ is significantly less than one, while for higher values of $Y'_{in}$, the slope of $F(Y'_{in})$ is approximately unity. The luminance signal $Y'_{out}$ which is output from processor 610 will be approximately the same as the signal $Y'_{in}$ input to processor 220 in FIG. 2.

Since the luminance signal processed in accordance with the present invention carried a smaller amount of quantization error or noise during encoding and transmission, the output signal $Y'_{out}$ will also carry less quantization noise. The resulting analog signal in R-G-B space that is provided to a display device such as a television will consequently carry less quantization noise, thereby resulting in an improved video image.

It should now be appreciated that the present invention provides a method and apparatus for reducing the effects of noise in a video processing system. A digital video signal containing a luminance component Y is processed to increase the amplitude of low amplitude luminance data in accordance with a nonlinear transfer function. As a result, high-frequency, low-amplitude components of the signal are reduced, which thereby also reduces subsequent quantization errors of transform coefficients which are produced by a spatial compression routine in a video encoder. Inverse operations are performed at a video decoder to recover the original luminance data. The invention reduces quantization noise which is manifested particularly as dust-like variations in luminance intensity in an otherwise darkened region of a video image.

Although the invention has been described in connection with various specific exemplary embodiments, it should be appreciated that numerous adaptations and modifications may be made thereto, without departing from the spirit and scope of the invention as set forth in the claims.

We claim:

1. A method for reducing noise visibility in a compressed digital video signal by reducing the presence of high-frequency, low-amplitude luminance spatial transform coefficients, comprising the steps of:
   providing a luminance data signal having luminance data values which represent pixel intensity of images in said compressed digital video signal;
   said luminance data values extending between low luminance values and high luminance values;
   processing said luminance data values to increase amplitudes of the low luminance values relatively more than amplitudes of the high luminance values in accordance with a transfer function, thereby obtaining processed luminance data values including processed low luminance values and processed high luminance values;
   spatially transforming and quantizing the processed luminance data values to provide luminance spatial transform coefficients of said compressed digital video signal;
   transmitting said luminance spatial transform coefficients to a decoder; and, at said decoder:
   (a) performing an inverse spatial transform on said transmitted spatial transform coefficients to recover data corresponding to the processed luminance data values, including the processed low luminance values and processed high luminance values; and
   (b) further processing the processed luminance data values to recover data corresponding to said luminance data values of said luminance data signal by decreasing amplitudes of the processed low luminance values relatively more than amplitudes of the processed high luminance values in accordance with an inverse function of said transfer function.

2. The method of claim 1, wherein:
   said transfer function is non-linear.

3. The method of claim 1, wherein:
   for each of said luminance spatial transform coefficients, the noise visibility is proportional to a ratio of an associated quantization error thereof and an associated amplitude thereof.

4. A method for decoding luminance spatial transform coefficients of a compressed digital video signal in which a presence of high-frequency, low-amplitude luminance spatial transform coefficients is reduced to reduce a noise visibility in accordance with a transfer function, comprising the steps of:
   transforming said luminance spatial transform coefficients by performing an inverse spatial transformation thereon, to recover luminance data values representing pixel intensity;
   the recovered luminance data values extending between recovered low luminance values and recovered high luminance values; and
   processing the recovered luminance data values to decrease amplitudes of said recovered low luminance values relatively more than amplitudes of said recovered high luminance values in accordance with an inverse function of said transfer function, thereby obtaining processed luminance data values including processed low luminance values and processed high luminance values;
   wherein said luminance spatial transform coefficients are obtained by processing pre-transmission luminance data values corresponding to said processed luminance data values, including pre-transmission low luminance values corresponding to said processed low luminance values, and pre-transmission high luminance values corresponding to said processed high luminance values, by increasing amplitudes of the pre-transmission low luminance values relatively more than amplitudes of the pre-transmission high luminance values in accordance with said transfer function.

5. The method of claim 4, wherein:
   said transfer function is non-linear.

6. The method of claim 4, wherein:
   for each of said luminance spatial transform coefficients, the noise visibility is proportional to a ratio of an associated quantization error thereof and an associated amplitude thereof.

7. An apparatus for reducing noise visibility in a compressed digital video signal by reducing the presence of high-frequency, low-amplitude luminance spatial transform coefficients, comprising:
   means for providing a luminance data signal having luminance data values which represent pixel intensity of images in said compressed digital video signal;
   said luminance data values extending between low luminance values and high luminance values;

means for processing said luminance data values to increase amplitudes of the low luminance values relatively more than amplitudes of the high luminance values in accordance with a transfer function, thereby obtaining processed luminance data values including processed low luminance values and processed high luminance values;

means for spatially transforming and quantizing the processed luminance data values to provide luminance spatial transform coefficients of said compressed digital video signal; and means for transmitting said luminance spatial transform coefficients to a decoder; wherein said decoder comprises:

(a) means for performing an inverse spatial transform on said transmitted spatial transform coefficients to recover data corresponding to the processed luminance data values, including the processed low luminance values and processed high luminance values; and (b) means for further processing the processed luminance data values to recover data corresponding to said luminance data values of said luminance data signal by decreasing amplitudes of the processed low luminance values relatively more than amplitudes of the processed high luminance values in accordance with an inverse function of said transfer function.

8. The apparatus of claim 7, wherein:

said transfer function is non-linear.

9. The apparatus of claim 7, wherein:

for each of said luminance spatial transform coefficients, the noise visibility is proportional to a ratio of an associated quantization error thereof and an associated amplitude thereof.

10. An apparatus for decoding luminance spatial transform coefficients of a compressed digital video signal in which a presence of high-frequency, low-amplitude luminance spatial transform coefficients is reduced to reduce a noise visibility in accordance with a transfer function, comprising:

means for transforming said luminance spatial transform coefficients by performing an inverse spatial transformation thereon, to recover luminance data values representing pixel intensity;

the recovered luminance data values extending between recovered low luminance values and recovered high luminance values; and means for processing the recovered luminance data values to decrease amplitudes of said recovered low luminance values relatively more than amplitudes of said recovered high luminance values in accordance with an inverse function of said transfer function, thereby obtaining processed luminance data values including processed low luminance values and processed high luminance values;

wherein said luminance spatial transform coefficients are obtained by processing pre-transmission luminance data values corresponding to said processed luminance data values, including pre-transmission low luminance values corresponding to said processed low luminance values, and pre-transmission high luminance values corresponding to said processed high luminance values, by increasing amplitudes of the pre-transmission low luminance values relatively more than amplitudes of the pre-transmission high luminance values in accordance with said transfer function.

11. The apparatus of claim 10, wherein:

said transfer function is non-linear.

12. The apparatus of claim 10, wherein:

for each of said luminance spatial transform coefficients, the noise visibility is proportional to a ratio of an associated quantization error thereof and an associated amplitude thereof.

* * * * *